United States Patent
Huo et al.

(10) Patent No.: US 9,436,043 B2
(45) Date of Patent: Sep. 6, 2016

(54) ARRAY SUBSTRATE AND LIQUID CRYSTAL DISPLAY PANEL

(71) Applicant: Shanghai Tianma Micro-Electronics Co., Ltd., Shanghai (CN)

(72) Inventors: Sitao Huo, Shanghai (CN); Wenxin Jiang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 98 days.

(21) Appl. No.: 13/897,281

(22) Filed: May 17, 2013

(65) Prior Publication Data

US 2013/0250224 A1  Sep. 26, 2013

Related U.S. Application Data

(63) Continuation of application No. PCT/CN2012/078214, filed on Jul. 5, 2012.

(30) Foreign Application Priority Data

Sep. 16, 2011  (CN) .......................... 2011 1 0274675

(51) Int. Cl.
*G02F 1/1335* (2006.01)
*G02F 1/1343* (2006.01)
*G02F 1/1362* (2006.01)
*G02F 1/1333* (2006.01)

(52) U.S. Cl.
CPC ..... *G02F 1/134309* (2013.01); *G02F 1/13624* (2013.01); *G02F 1/133555* (2013.01); *G02F 1/136286* (2013.01); *G02F 1/133371* (2013.01); *G02F 1/136213* (2013.01); *G02F 2201/40* (2013.01)

(58) Field of Classification Search
CPC .................. G02F 1/134309; G02F 1/133555; G02F 1/13624; G02F 1/136286
USPC ........................................................... 349/114
See application file for complete search history.

(56) References Cited

U.S. PATENT DOCUMENTS 6,452,654 B2 * 9/2002 Kubo et al. ................... 349/114
7,224,420 B2 * 5/2007 Luo .............................. 349/114
2006/0050208 A1 3/2006 Enomoto et al.

FOREIGN PATENT DOCUMENTS

| CN | 1554969 | 12/2004 |
|---|---|---|
| CN | 1573480 | 2/2005 |
| CN | 101405648 | 4/2009 |
| JP | 2009-282102 A | 12/2009 |

(Continued)

OTHER PUBLICATIONS

International Search Report as issued in PCT/CN/2012/078214, dated Sep. 25, 2012.

(Continued)

*Primary Examiner* — James Dudek
(74) *Attorney, Agent, or Firm* — Alston & Bird LLP

(57) ABSTRACT

An array substrate includes a plurality of pixels arranged in rows and columns. Gate lines are formed along rows of the pixels, and data lines are formed along columns of the pixels. A reflection electrode is near an edge of the some of the pixels, and a transmission electrode is near an edge of others of the pixels. As a result, light transmittance of the array substrate and of a liquid crystal display panel using the array substrate is increased.

20 Claims, 11 Drawing Sheets

(56) References Cited

FOREIGN PATENT DOCUMENTS

| | | |
|---|---|---|
| JP | 2009282102 | 12/2009 |
| KR | 20070079994 | 8/2007 |
| WO | WO2007/119288 A1 | 10/2007 |

OTHER PUBLICATIONS

First Office Action issued on Apr. 28, 2014 in Korean Application No. 10-2013-7013194, 6 pages (English translation, 6 pages).
European Search Report for European Application No. 12831156.0, mailed on May 28, 2015, 11 pages total.

* cited by examiner

ARRAY SUBSTRATE AND LIQUID CRYSTAL DISPLAY PANEL

CROSS-REFERENCES TO RELATED APPLICATIONS

This application claims priority to and is a continuation of International Patent Application PCT/CN2012/078214, titled "ARRAY SUBSTRATE AND LIQUID CRYSTAL DISPLAY PANEL," filed on Jul. 5, 2012, which claims priority to Chinese Patent Application No. 201110274675.1, titled "ARRAY SUBSTRATE AND LIQUID CRYSTAL DISPLAY PANEL", filed with State Intellectual Property Office of PRC on Sep. 16, 2011, the contents of which are incorporated herein by reference in their entirety.

FIELD OF THE INVENTION

The present invention relates to liquid crystal display, and in particular to an array substrate and a liquid crystal display panel including the array substrate.

BACKGROUND OF THE INVENTION

A liquid crystal display device has advantages, such as low voltage, low power consumption, large display, high quality color, and the like. Currently the liquid crystal display device is widely applied in electronic equipment, such as a computer, an electronic notepad, a mobile phone, a video camera and a high definition television. The liquid crystal display device generally includes a liquid crystal display panel configured to display images and a circuit portion configured to provide signals to the liquid crystal display panel. The liquid crystal display panel generally includes a thin film transistor (TFT) array substrate, an upper substrate and a liquid crystal substance located between the array substrate and the upper substrate.

The liquid crystal display panel is different from a cathode ray tube display device or a plasma display device in that the liquid crystal display panel itself does not emit light, but achieves an objective of display by modulating external incident light. A liquid crystal display displays information by modulating contrast in reflection and transmission of incident light.

The liquid crystal display panel has a transmission mode and a reflection mode according to different sources of the external light. A transmission type liquid crystal display panel uses a light emitted from a backlight provided by the liquid crystal display device itself for displaying. Disadvantages of a transmission display mode are that a backlight source has to be in a normally on state, leading to large power consumption. In addition, images are influenced by the external light when the liquid crystal display device is used outdoors, causing the images to not be displayed clearly. However, unlike the transmission type liquid crystal display panel, a reflection type liquid crystal display panel displays an image by reflecting and modulating the external light. An advantage of the reflection display mode is that the power consumption is reduced significantly. But this reflection display mode still has disadvantages. For example, the external light has to be strong enough. Considering the two display modes described above, technicians develop a transflective liquid crystal display panel, in which there is a transmission function and a reflection function in the same pixel. Accordingly, the backlight passes through the transmission region in the transmission mode, and the external light passes through the reflection region in the reflection mode. Therefore the transflective liquid crystal display panel has significant advantages in aspects of readability outdoors and reduction in the power consumption.

A plurality of video signal lines (also known as data lines) and a plurality of scanning lines (also known as gate lines) intersect one another on the thin film transistor array substrate. A plurality of regions are defined by these video signal lines and scanning lines. A pixel is included in each region. Each pixel includes a pixel electrode and a switching element TFT configured to selectively supply video signals to the pixel electrode.

In the related art, on the thin film transistor array substrate of the transflective liquid crystal display panel, a reflection electrode generally surrounds a transmission electrode in each pixel. Therefore the reflection electrodes of adjacent pixels are adjacent. Moreover, since both of the reflection electrodes are formed by a same conductive layer, in order to avoid a short circuit between the two adjacent pixels, the reflection electrodes of the two pixels are generally spaced apart. However, such structure of the thin film transistor array substrate results in reduced area of the reflection region and the transmission region. The reduction of these regions results in a reduced utilization ratio (aperture ratio).

In view of this, a new array substrate and a new liquid crystal display panel including the array substrate is needed to solve the problem of low utilization ratio (aperture ratio) caused by the existing thin film transistor array substrate.

SUMMARY OF THE INVENTION

One implementation is an array substrate, including a plurality of gate lines in a row direction, a plurality of data lines in a column direction, and a plurality of pixels near intersections of the gate lines and the data lines. The pixels include a first pixel including a reflection electrode near an edge of the first pixel, and a second pixel including a transmission electrode near an edge of the second pixel.

Another implementation is a liquid crystal display panel, including an upper substrate, and an array substrate. The array substrate includes a plurality of gate lines in a row direction, a plurality of data lines in a column direction, and a plurality of pixels near intersections of the gate lines and the data lines. The pixels include a first pixel including a reflection electrode near an edge of the first pixel, and a second pixel including a transmission electrode near an edge of the second pixel. The liquid crystal display panel also includes a liquid crystal between the upper substrate in the array substrate.

DETAILED DESCRIPTION OF THE INVENTION

In each pixel of an array substrate of the existing transflective liquid crystal display panel, a reflection electrode surrounds a transmission electrode. Therefore the reflection electrodes of adjacent pixel are adjacent. Since both of the reflection electrodes of adjacent pixels are formed by a same layer of metal, in order to avoid a short circuit of the reflection electrodes of the two adjacent pixels, the reflection electrodes of the two adjacent pixels are spaced apart.

A new array substrate of a transflective liquid crystal display panel has a distance between adjacent pixels which is reduced, and therefore the aperture ratio of the pixel is increased.

Certain features and advantages of various embodiments are described in conjunction with the accompanying drawings as follows. In some instances, the drawings are not made in actual proportion.

A First Embodiment

An array substrate includes a plurality of pixels arranged in a matrix. The pixels are located near intersections of a plurality of gate lines in a row direction and a plurality of data lines in a column direction. The pixels include a first pixel and a second pixel. A reflection electrode is provided at an edge region of the first pixel, and a transmission electrode is provided at an edge region of the second pixel.

Figure 1:
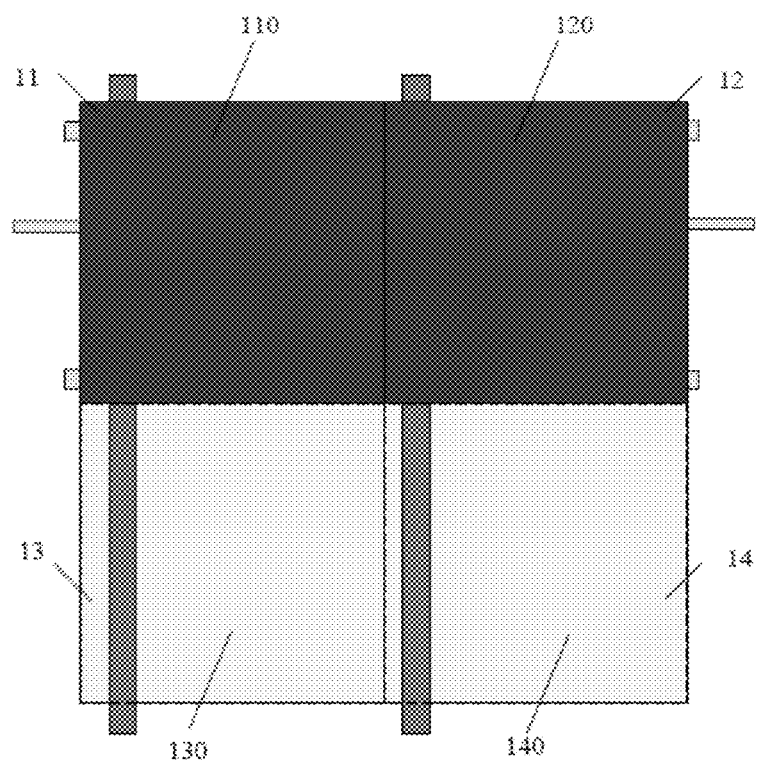
FIG. 1 is a top view of an array substrate according to a first embodiment.

Referring to FIG. 1, embodiments of first pixels 11 and 12 and second pixels 13 and 14 are shown. Other regions may include repeated instances of the first and second pixels. The first pixel 11 is adjacent to the second pixel 13, and the first pixel 12 is adjacent to the second pixel 14.

As shown in FIG. 1, in the first embodiment, a reflection electrode 110 is in first pixel 11. The reflection electrode 110 in the central region and in the edge region of the first pixel 11 is the same metal layer and is formed in a same process step. Similarly, the central region and edge region of reflection electrode 120 are also formed together.

A transmission electrode 130 is provided in the central and edge regions of the second pixel 13. The transmission electrode 130 in the central region and in the edge region of the second pixel 13 is on a same transparent conductive layer and is formed in a same process step. Similarly, the central region and edge region of transmission electrode 130 are also formed together.

At an edge where the first pixel 11 is adjacent to the second pixel 13, there is an insulating layer, which is configured to electrically insulate the reflection electrode 110 from the transmission electrode 130. Specifically, in this embodiment, the transmission electrode 130 is at a lower layer, the insulating layer is above the transmission electrode 130, and the reflection electrode 110 is above the insulating layer. Similarly, along an edge where the first pixel 12 is adjacent to the second pixel 14 is an insulating layer, which is configured to electrically insulate the reflection electrode 120 from the transmission electrode 140.

The reflection electrode is adjacent to the transmission electrode between the first pixel unit and the second pixel unit which are adjacent to each other by a design described above. The reflection electrodes generally include a metal layer. The transmission electrodes generally include a transparent conductive layer such as indium oxide tin layer. The reflection electrodes and the transmission electrodes are not on a same layer, and the reflection electrode is spaced from the transmission electrode with an insulating layer therebetween so as to insulate them from each other. Therefore, the first pixel and the second pixel which are adjacent to each other are not required to be spaced apart. The transmission electrode and the reflection electrode respectively located in edge regions of the first pixel and the second pixel can be directly adjacent to each other, may abut, or may be overlapped partly. Thus, a display aperture ratio is increased while reducing a requirement for accuracy of manufacturing process.

A Second Embodiment

FIG. 2 to FIG. 5 are structure schematic diagrams of different layers of an array substrate according to a second embodiment. FIG. 6 is a cross-sectional schematic diagram of the array substrate along line A-A in FIG. 5. In order to make a layout of data lines, gate lines, thin film transistors and storage capacitors of the array substrate illustrated in the second embodiment to be clearer, a detailed description will be given in conjunction with FIG. 2 to FIG. 6.

Figure 5:
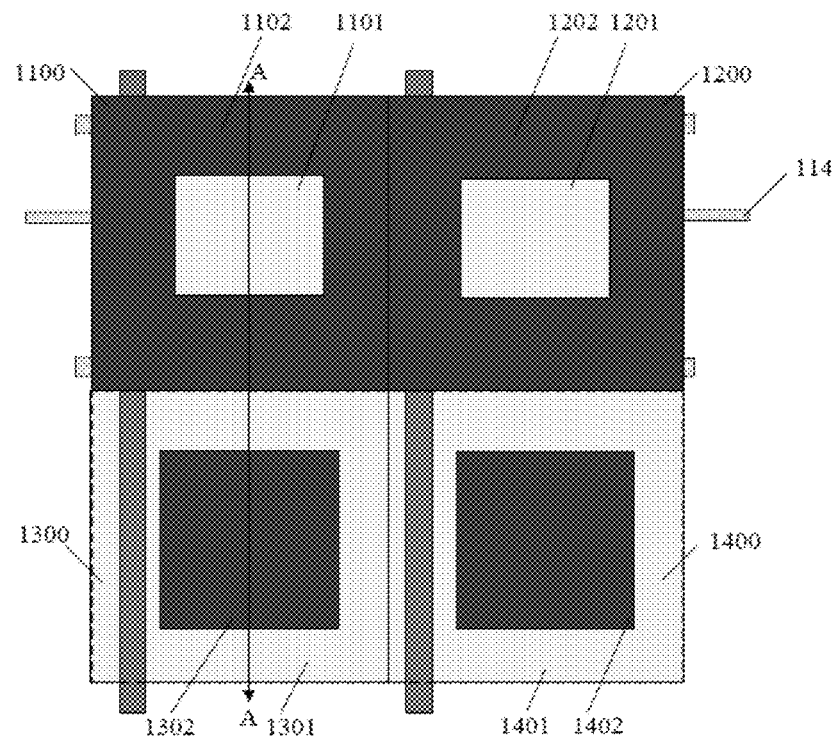
FIG. 5 is a top view illustrating the array substrate according to the second embodiment.
Figure 6:
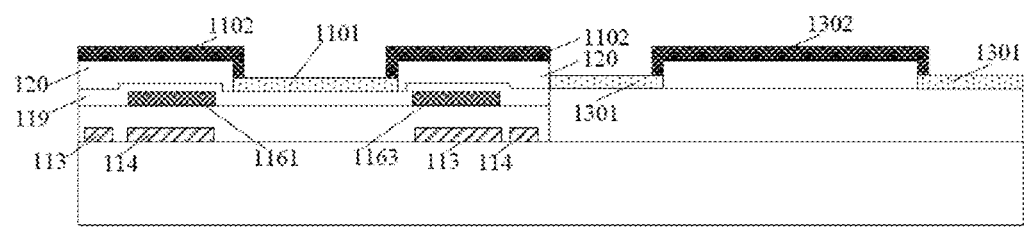
FIG. 6 is a cross-sectional schematic diagram illustrating the array substrate along line A-A in FIG. 5.

FIG. 5 is a top view of the array substrate according to the second embodiment. As shown in FIG. 5, the array substrate according to the second embodiment includes four pixels: a first pixel 1100, a first pixel 1200, a second pixel 1300 and a second pixel 1400. The first pixels are arranged in rows. Only two first pixels are shown in FIG. 5, and other first pixels arranged with the first pixel 1100 and the first pixel 1200 in a same row may further be included. The second pixels are arranged in rows. Only two second pixels are shown in FIG. 5, but other second pixels arranged with the second pixel 1300 and the second pixel 1400 in a same row may further be included.

An edge region of the first pixel 1100 is provided with a reflection electrode 1102, the central region of the first pixel 1100 is provided with a rectangular transmission electrode 1101, and the reflection electrode 1102 and the transmission electrode 1101 are electrically connected. An edge region of the first pixel 1200 is provided with a reflection electrode 1202, the central region of the first pixel 1200 is provided with a rectangular transmission electrode 1201, and the reflection electrode 1202 and the transmission electrode 1201 are also electrically connected. Alternatively, the transmission electrode 1201 and the transmission electrode 1101 may be in other shapes such as rhombus or circle.

An edge region of the second pixel 1300 is provided with a transmission electrode 1301, the central region of the second pixel 1300 is provided with a rectangular reflection electrode 1302, and the reflection electrode 1302 and the transmission electrode 1301 are electrically connected. An edge region of the second pixel 1400 is provided with a transmission electrode 1401, the central region of the second pixel 1400 is provided with a rectangular reflection electrode 1402, and the reflection electrode 1402 and the transmission electrode 1401 are also electrically connected. The reflection electrode 1302 and the reflection electrode 1402 may also be other shapes, such as rhombus or circle.

In some embodiments, the areas of all reflection electrodes are the same, and the areas of all transmission electrodes are also the same. Thereby uniformity of display can be increased.

Figure 2:
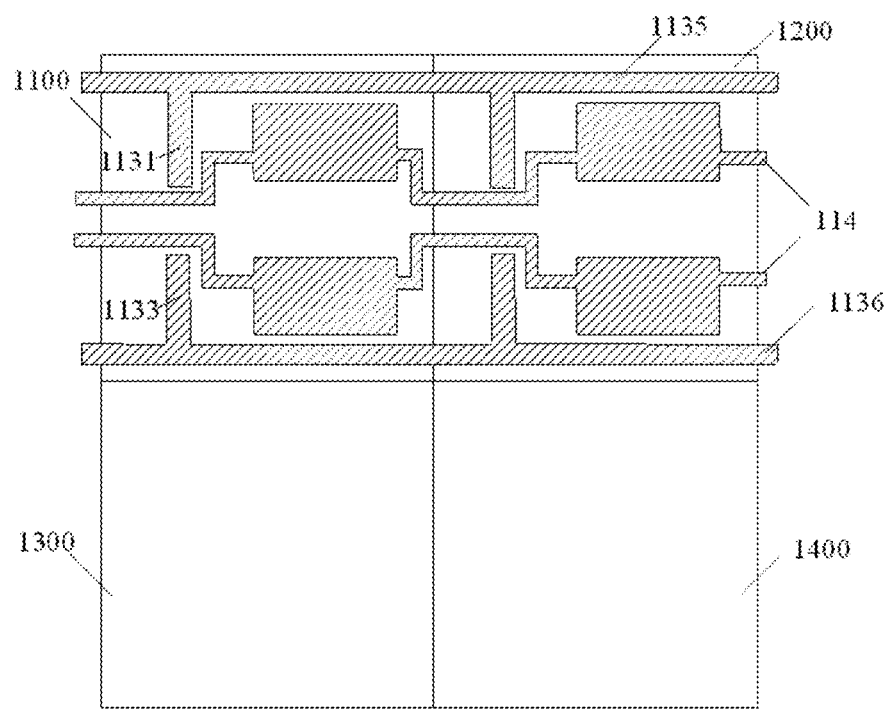
FIG. 2 is a distribution schematic diagram illustrating a gate line and a common electrode line of an array substrate according to a second embodiment.

The gate line driving the row of the first pixels is provided under the reflection electrode located in the edge region of each of the first pixels in the row of the first pixels and is shielded by the reflection electrodes. As shown in FIG. 2 and FIG. 5, a part of a gate line 1135 in the first pixel 1100 and the first pixel 1200, for driving the row of the first pixels is provided under the reflection electrode 1102 located in the edge region of the first pixel 1100 and the reflection electrode 1202 located in the edge region of the first pixel 1200. Only two first pixels are shown in FIG. 2 to FIG. 5. Similarly, in the case that more first pixels are arranged in the row direction, the gate line controlling the row of the first pixels is provided under the reflection electrode located in the edge region of each of the first pixels, that is, the gate line is shielded completely by the reflection electrodes along the row.

The gate line driving the row of the second pixels is provided under the reflection electrodes located in the edge region of each of the first pixels in the row of the first pixels which is adjacent to the row of the second pixels and is sheltered by the reflection electrodes. As shown in FIG. 2 and FIG. 5, a gate line 1136 driving the second pixel 1300 and the second pixel 1400 is provided under the reflection electrode 1102 located in the edge region of the first pixel 1100 and the reflection electrode 1202 located in the edge region of the first pixel 1200 of the row of first pixels which is adjacent to the second pixel 1300 and the second pixel 1400. In the case that more second pixels are arranged in the row direction, the gate line controlling the row of the second pixels is provided under the reflection electrode located in the edge region of each of the first pixels in the row of first pixels which is adjacent to the row of the second pixels. Accordingly, the gate line is sheltered by the reflection electrodes of the adjacent row.

Such layout of the gate line 1135 and the gate line 1136 results in an increase in the aperture ratio of the pixels. Specifically, since the gate line is of a metal wiring, the gate line could occupy a certain aperture ratio in the conventional design. In the present embodiment, the display area occupied by the gate line is greatly reduced or eliminated by the layout described above.

Figure 3:
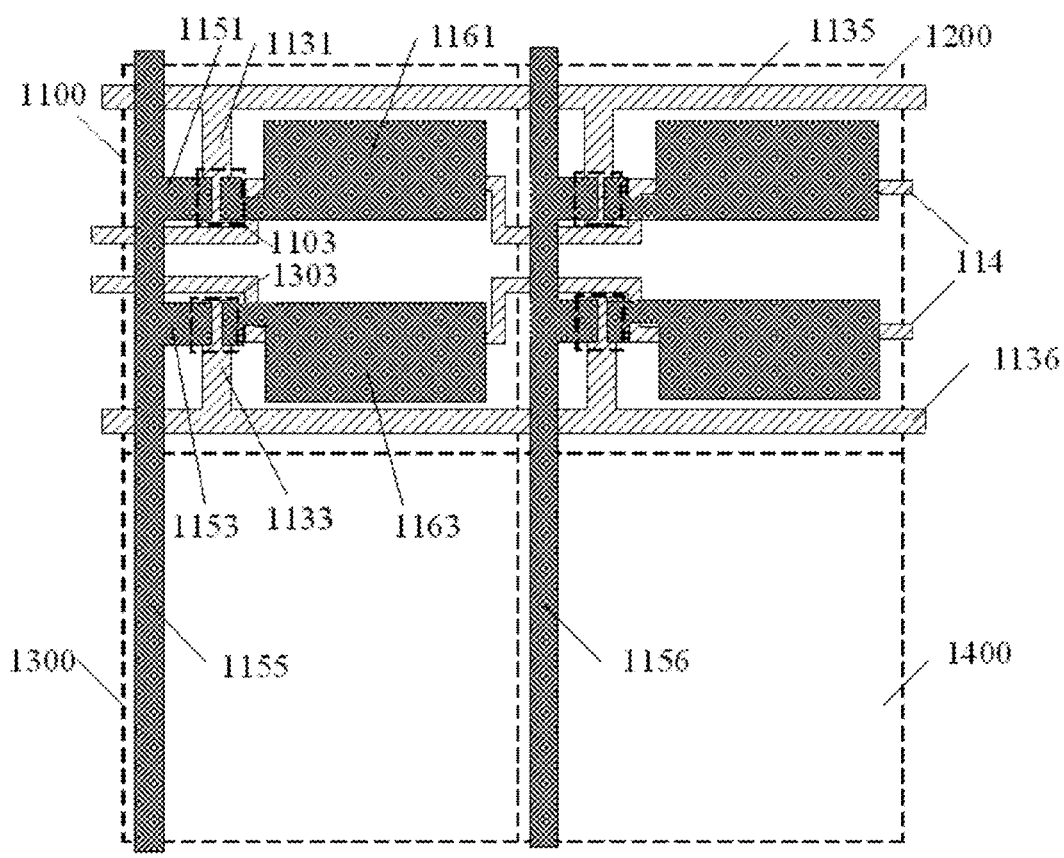
FIG. 3 is a distribution schematic diagram illustrating a data line and a source electrode and a drain electrode of a thin film transistor of the array substrate according to the second embodiment.

Referring to FIG. 3 and FIG. 5, a data line is included. The first pixel 1100 and the second pixel 1300 are driven by a same data line 1155; similarly, the first pixel 1200 and the second pixel 1400 are driven by a same data line 1156. A part of the data line 1155 in the first pixel 1100 and a part of the data line 1156 in the first pixel 1200 are provided under the reflection electrode 1102 located in the edge region of the first pixel 1100 and the reflection electrode 1202 located in the edge region of the first pixel 1200 respectively, and are shielded by the reflection electrodes. In the present embodiment, even though the data line provided in the second pixel 1300 and the second pixel 1400 may influence the aperture ratio of the pixels, the aperture ratio occupied by the data line is reduced because of the shielding by the reflection electrodes.

The thin film transistors are further provided in each pixel. In the conventional design, the thin film transistors controlling the pixels may also occupy a certain aperture ratio. In order to further increase the aperture ratio, in the array substrate according to the second embodiment, the thin film transistor driving the first pixel is provided under the reflection electrode located in the edge region of the first pixel, and the thin film transistor driving the second pixel is provided under the reflection electrode located in the edge region of the first pixel which are adjacent to the second pixel.

Specifically, referring to FIG. 2, FIG. 3 and FIG. 5, and taking the first pixel 1100 and the second pixel 1300 as an example, a thin film transistor 1103 driving the first pixel 1100 is provided under the reflection electrode 1102 located in the edge region of the first pixel 1100, and a thin film transistor 1303 driving the second pixel 1300 is also provided under the reflection electrode 1102 located in the edge region of the first pixel 1100.

The thin film transistor 1103 and the thin film transistor 1303 each include a gate electrode, a gate electrode insulating layer, a semiconductor layer, a source electrode and a drain electrode. Specifically, a gate electrode 1131 of the thin film transistor 1103 is formed by a part of the gate line 1135 extending towards interior of the first pixel 1100. In addition, a gate electrode 1133 of the thin film transistor 1303 is formed by a part of the gate line 1136 extending towards interior of the first pixel 1100. A source electrode 1151 of the thin film transistor 1103 is formed by the data line 1155 extending towards interior of the first pixel 1100 to an overlapped place with the gate electrode 1131, and a source electrode 1153 of the thin film transistor 1303 is formed by the data line 1155 extending towards interior of the first pixel 1100 to an overlapped place with the gate electrode 1133. While forming the source electrode 1151 and the source electrode 1153, a drain electrode 1161 of the thin film transistor 1103 and a drain electrode 1163 of the thin film transistor 1303 are also formed. The drain electrode 1161 and the gate electrode 1131 are overlapped. The drain electrode 1163 and the gate electrode 1133 are overlapped.

Figure 4:
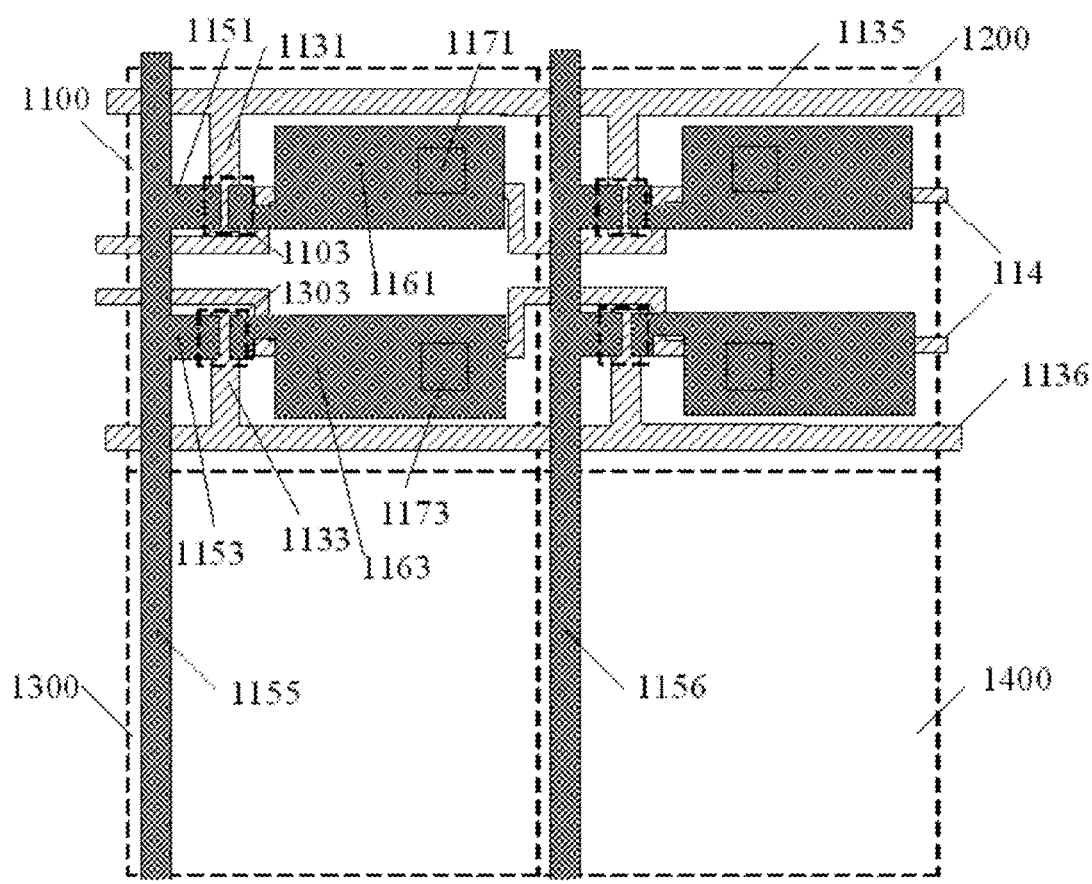
FIG. 4 is a distribution schematic diagram illustrating a via hole corresponding to the drain electrode of the thin film transistor of the array substrate of the second embodiment.

Referring to FIG. 4 and FIG. 5, a passivation layer 119 is formed on the structure shown in FIG. 3, and a via hole 1171 and a via hole 1173 are respectively formed in the passivation layers 119 of the drain electrode 1161 of the first pixel 1100 and the drain electrode 1163 of the second pixel 1300. The transmission electrode 1101 is electrically connected with the drain electrode 1161 by the via hole 1171, and the transmission electrode 1301 is electrically connected with the drain electrode 1163 by the via hole 1173.

In the process of controlling liquid crystal molecules with the array substrate together and an upper substrate (for example, a color film substrate), an equivalent circuit of the array substrate and the upper substrate is one capacitor which is known as a liquid crystal capacitor. However the liquid crystal capacitor can not retain a voltage forward duration during which the data line updates an image next time. In other words, after the liquid capacitor is charged by the thin film transistor, the liquid crystal capacitor can not retain the voltage the entire time when the thin film transistor charges the pixel again. Since a variation of the voltage may result in a variation of display of the liquid crystal, a storage capacitor is generally included to retain the voltage until the thin film transistor charges the pixel again.

In order to increase the aperture ratio of the pixel, in the second embodiment, the storage capacitor is provided under the reflection electrode of the pixel. Specifically, referring to FIG. 2 to FIG. 6, in the present embodiment, a storage capacitor of the first pixel 1100 and a storage capacitor of the second pixel 1300 which are adjacent to the first pixel 1100 are formed under the reflection electrode 1102 located in the edge region of the first pixel 1100. In addition a storage capacitor of the first pixel 1200 and a storage capacitor of the second pixel 1400 which his adjacent to the first pixel 1200 are formed under the reflection electrode 1202 located in the edge region of the first pixel 1200.

In the process of manufacturing the array substrate, the gate line is generally provided along a surface of a glass substrate, and a common electrode line 114 is also provided in the same layer as the gate line. The common electrode line 114 may serve as the lower plate of the storage capacitor. The upper plate of the storage capacitor may be the drain electrode of the thin film transistor. Since the storage capacitor does not occupy the aperture ratio, a larger storage capacitor may be provided so as to increase the ability of the pixel to retain voltage.

A structure shown in FIG. 6 is a cross-sectional view along A-A straight line in FIG. 5. Taking the first pixel 1100 and the second pixel 1300 as an example, in the first pixel 1100, the common electrode line 114 and the drain electrode 1161 form the storage capacitor of the first pixel 1100, the common electrode line 114 and the drain electrode 1163 form the storage capacitor of the second pixel 1300. In the first pixel 1100, an organic film 120 is formed on the transmission electrode 1101 and the passivation layer 119. The organic film 120 is provided with the reflection electrode 1102, and the reflection electrode 1102 is electrically connected with the transmission electrode 1101. In addition, an organic film 120 is also formed between the reflection electrode 1202 of the first pixel 1100 and the transmission electrode 1301 of the second pixel 1300 which is adjacent to the first pixel 1100 in the column direction.

Inside the pixel, the organic film adjusts the cell gap of the reflection electrode to be a half of the cell gap of the transmission electrode, and it adjusts an optical path difference. At a same time, the adjacent reflection electrode and transmission electrode at the edge of the pixel may be overlapped partly, and the thin film transistor of the second pixel is provided under the reflection electrode of the first pixel which is adjacent to the second pixel. As shown in FIG. 5, the thin film transistor 1303 of the second pixel 1300 is provided under the reflection electrode 1102 located in the edge region of the first pixel 1100, and a part of the transmission electrode 1301 of the second pixel 1300 extends under the reflection electrode 1102 of the first pixel 1100 to connect to the drain electrode 1163 of the thin film transistor 1303. Therefore, the reflection electrode 1102 and the transmission electrode 1301 are overlapped partly. The organic film may make the transmission electrode and the reflection electrode located in the edge region to be insulated from each other, and the organic film is equivalent to the insulating layer in the first embodiment. That is, the insulating layer in the second embodiment is the organic film, and, in some embodiments, a thickness of the organic film 120 is generally about 200 μm. This may ensure that crosstalk interference is very small, and an operation of the array substrate is not influenced.

A Third Embodiment

The third embodiment differs from the second embodiment at least in that a first pixel and a second pixel are arranged in columns and the column of the first pixels and the column of the second pixels are spaced apart in a column direction.

Figure 7:
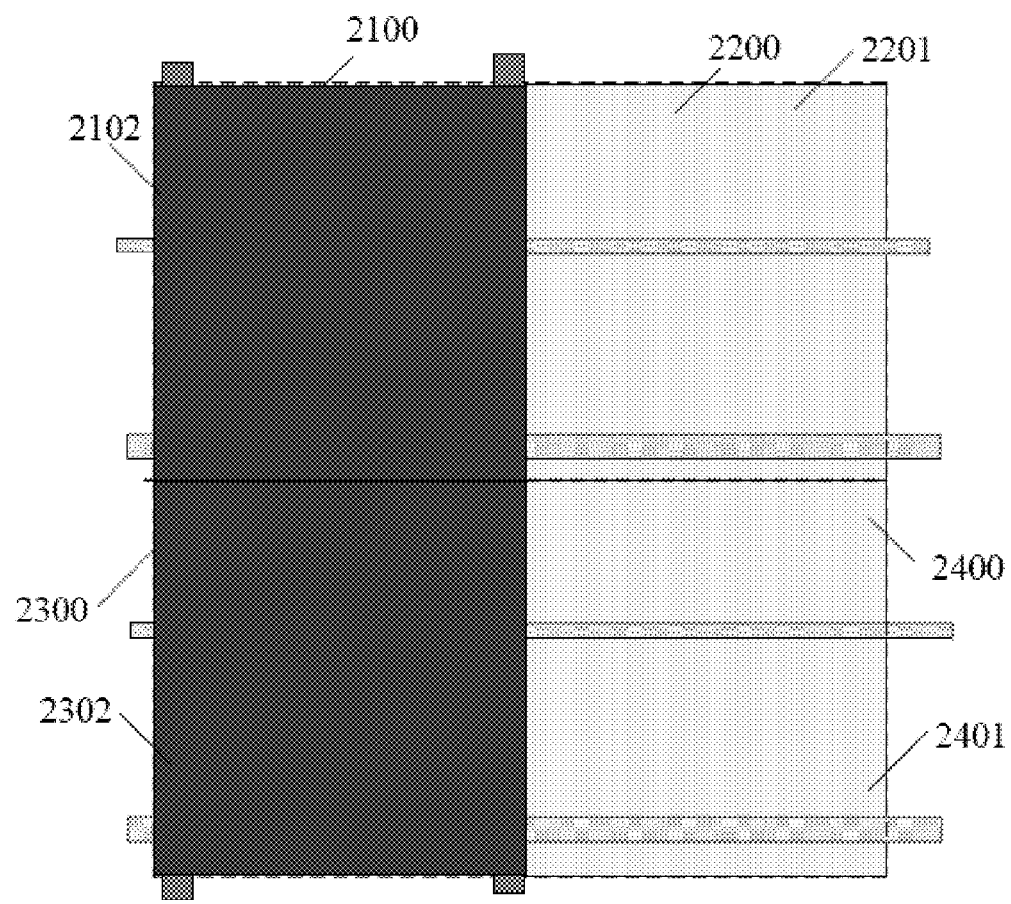
FIG. 7 is a top view illustrating an array substrate according to a third embodiment.
Figure 8:
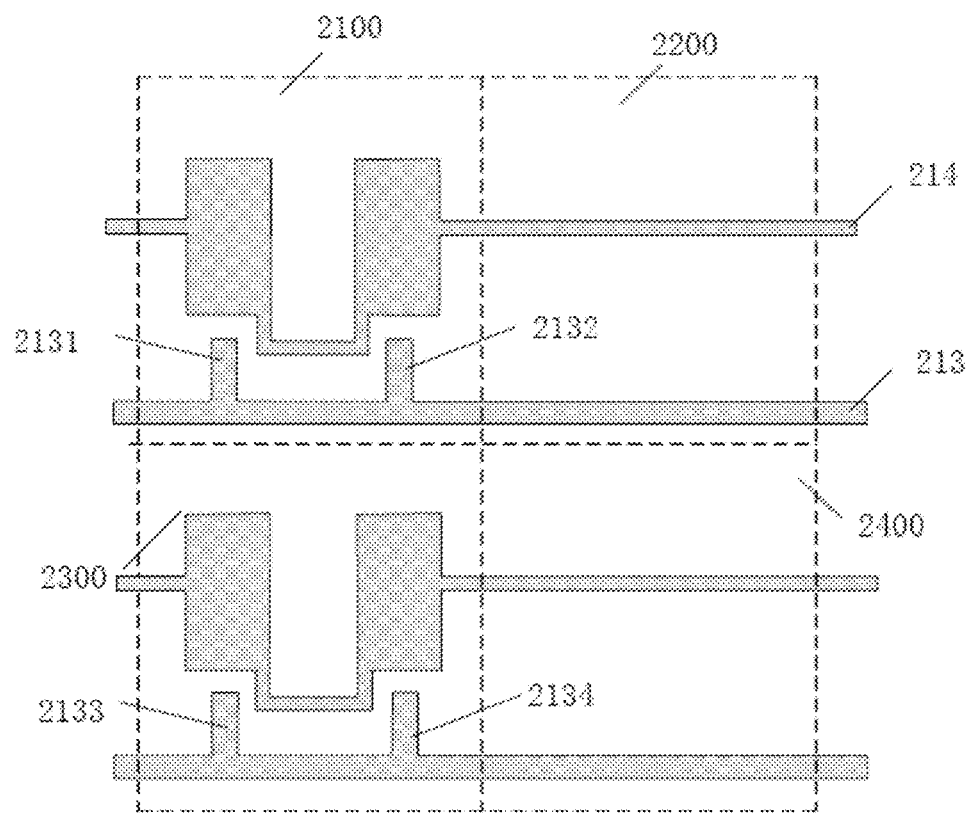
FIG. 8 is a distribution schematic diagram illustrating a gate line and a common electrode line of the array substrate according to the third embodiment.

Specifically, a top view of an array substrate formed by the column of the first pixel and the column of the second pixel which are spaced apart in the column direction is as shown in FIG. 7. The central region of a first pixel 2100 is provided with a reflection electrode. The reflection electrodes 2102 in central and edge region of first pixel 2100 are formed by a same reflection metal layer. The layout of a first pixel 2300 is same as the layout of the first pixel 2100. The central region of a second pixel 2200 is also provided with a transmission electrode. The transmission electrodes 2201 in central and edge region of second pixel 2200 are formed by a same transparent conductive layer. The layout of a second pixel 2400 is same as the layout of the second pixel 2200.

Arranging in columns and spacing apart of the first pixels and the second pixels may make a layout of a data line, a gate line, a thin film transistor and a storage capacitor in the array substrate to be different from that in the second embodiment. A detailed description will be performed in conjunction with FIG. 7 to FIG. 10 hereinafter.

Figure 9:
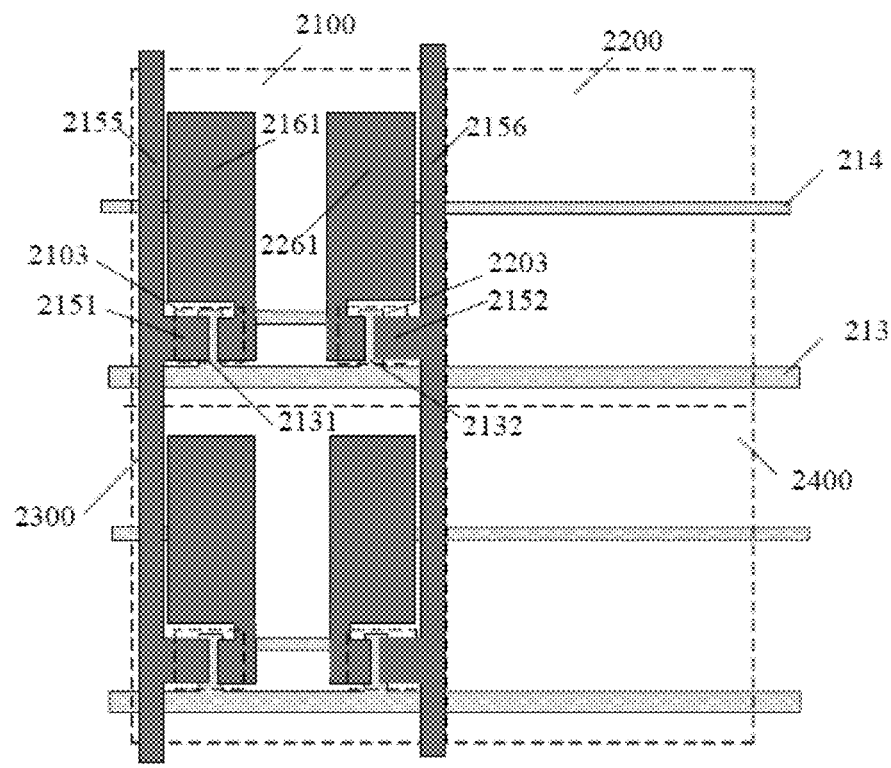
FIG. 9 is a distribution schematic diagram illustrating a data line and a source electrode and a drain electrode of a thin film transistor of the array substrate according to the third embodiment.

Referring to FIG. 7 and FIG. 9, a data line 2155 driving the column of the first pixels (only the first pixel 2100 and the first pixel 2300 are shown in the figure) is provided under the reflection electrode (only a reflection electrode 2102 and a reflection electrode 2302 are shown in the figure) located in the edge region of each of the first pixel in the column of the first pixels. A data line 2156 driving the column of the second pixels (only the second pixel 2200 and the second pixel 2400 are shown in the figure) is provided under the reflection electrode (only the reflection electrode 2102 and the reflection electrode 2302 are shown in the figure) of the first pixels adjacent to the column of the second pixels. With the layout described above, each data line is provided under the reflection electrode of the column of the first pixels, and is shielded by a reflection metal and does not occupy the area of transmission light, and an aperture ratio is greatly decreased.

Similar to the second embodiment, the thin film transistor controlling the first pixel is provided under the reflection electrode located in the edge region of the first pixel, the thin film transistor controlling the second pixel is provided under the reflection electrode located in the edge region of the first pixel which is adjacent to the second pixel. In the third embodiment, as shown in the figures, a thin film transistor 2103 driving the first pixel 2100 is provided under the reflection electrode 2102 of the first pixel 2100, and a thin film transistor 2203 driving the second pixel 2200 is also provided under the reflection electrode 2102 of the first pixel 2100.

Specifically, the thin film transistor includes a gate electrode, a gate electrode insulating layer, a semiconductor layer, a source electrode and a drain electrode. A gate electrode 2131 and a gate electrode 2132 are respectively formed by a part of a gate line 213 extending towards interior of the first pixel 2100. In addition, a source electrode 2151 is formed by the data line 2155 driving the first pixel 2100 extending towards interior of the first pixel 2100. Furthermore, a source electrode 2152 is formed by the data line 2156 driving the second pixel 2200 extending towards interior of the first pixel 2100. A drain electrode 2161 and a drain electrode 2261 are also formed while the source electrode is formed.

Figure 10:
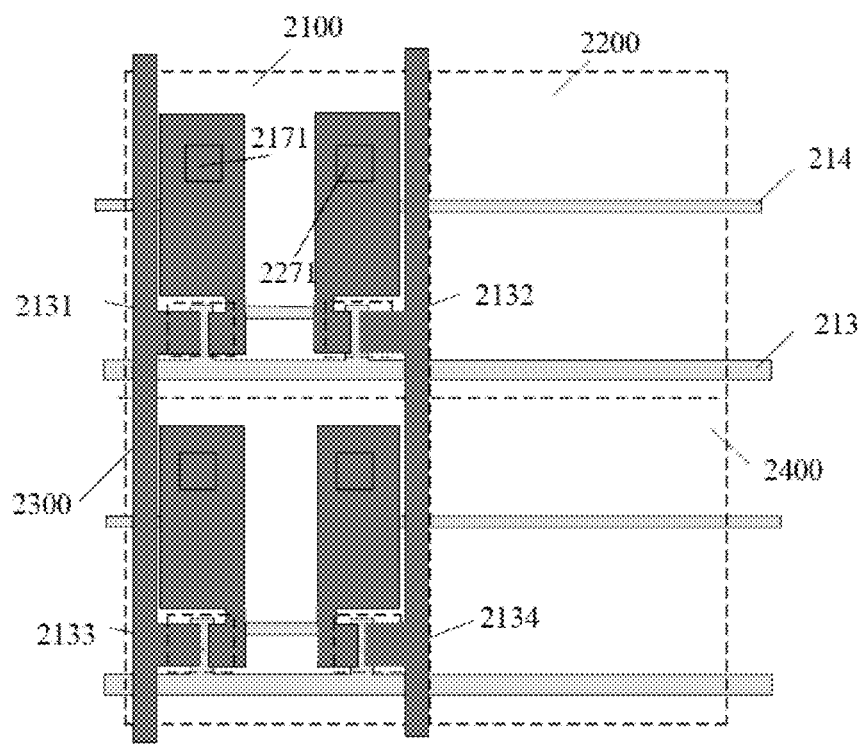
FIG. 10 is a distribution schematic diagram illustrating a via hole corresponding to the drain electrode of the thin film transistor according to the third embodiment.

Referring to FIG. 10, a passivation layer is formed on the structure shown in FIG. 9, and a via hole 2171 configured to electrically connect the reflection electrode 2102 and the drain electrode 2161 is formed in the passivation layer. A via hole 2271 configured to electrically connect the transmission electrode 2201 and the drain electrode 2261 is also formed.

Similar to the second embodiment, a storage capacitor of the first pixel is provided under the reflection electrode located in the edge region of the first pixel, and a storage capacitor of the second pixel is provided under the reflection electrode located in the edge region of the adjacent first pixel. Specifically, referring to FIG. 7 to FIG. 10, in the present embodiment, a storage capacitor of the first pixel 2100 and a storage capacitor of the second pixel 2200 which is adjacent to the first pixel 2100 are all formed under the reflection electrode 2102 of the first pixel 2100. In addition, a storage capacitor of the first pixel 2300 and a storage capacitor of the second pixel 2400 which is adjacent to the first pixel 2300 are formed under the reflection electrode 2302 of the first pixel 2300.

In the third embodiment, the central region of the first pixel is also provided with the reflection electrode and the central region of the second pixel is also provided with the transmission electrode may be that the central region of the first pixel is provided with the transmission electrode and the central region of the second pixel is provided with the reflection electrode, by which an effect of display may be further increased.

A Fourth Embodiment

First pixels and second pixels in an array substrate according to the fourth embodiment are all spaced apart in the row and column directions. In other words, pixels which are adjacent to the first pixels in upper, lower, left and right directions are all second pixels, and pixels which are adjacent to the second pixel in upper, lower, left and right directions are all first pixels.

Figure 14:
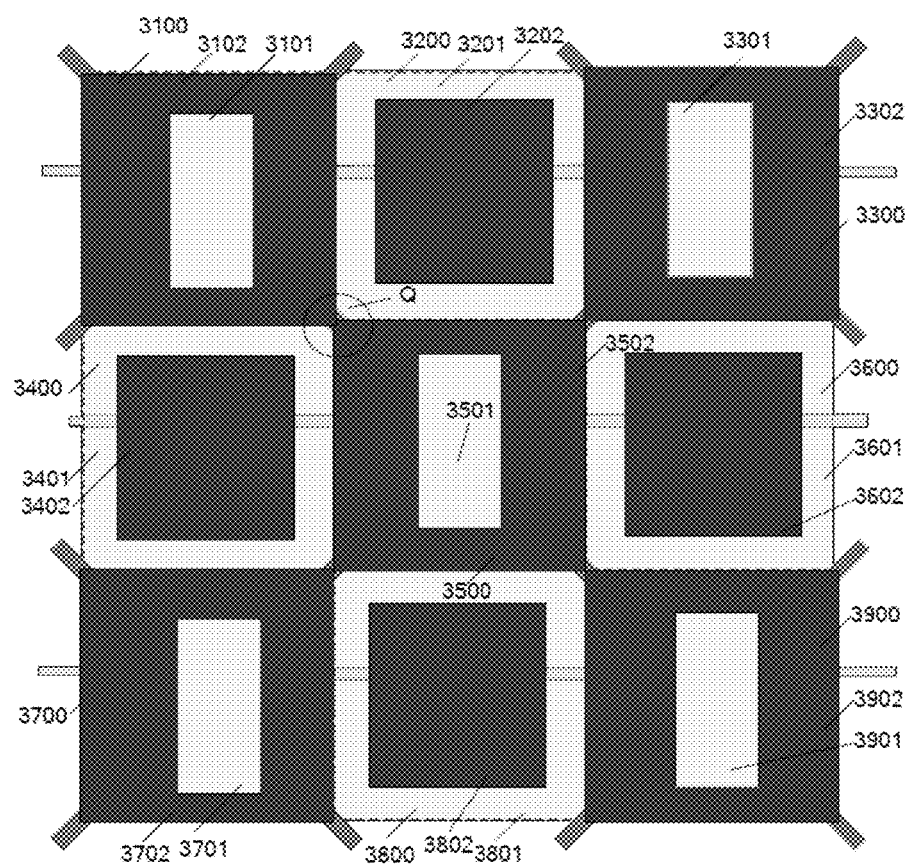
FIG. 14 is a top view illustrating the array substrate of the fourth embodiment.

Specifically, referring to FIG. 14, the array substrate according to the fourth embodiment includes a first pixel 3100, a first pixel 3300, a first pixel 3500, a first pixel 3700, a first pixel 3900, a second pixel 3200, a second pixel 3400, a second pixel 3600, and a second pixel 3800. The first pixels and the second pixels are spaced apart in the row and column directions. By a design described above, so that the pixels which are adjacent to the first pixel in upper, lower, left and right directions are second pixels, and the pixels which are adjacent to the second pixel in upper, lower, left and right directions are also all first pixels. For example, the first pixel 3500 is respectively adjacent to the second pixel 3200, the second pixel 3800, the second pixel 3400, and the second pixel 3600 in upper, lower, left and right directions. In addition, the second pixel 3600 is respectively adjacent to the first pixel 3300, and the first pixel 3900 and the first pixel 3500 in upper, lower and left directions. The second pixel 3600 is also adjacent to a first pixel, which is not shown in FIG. 14, in the right direction.

In the array substrate according to the fourth embodiment, the pixels which are adjacent to the first pixel in upper, lower, left and right directions are second pixels, and the pixels which are adjacent to the second pixel in upper, lower, left and right directions are first pixels. Therefore, reflection electrodes and transmission electrodes are adjacent to each other in four directions. Since the reflection electrodes are formed from metals, the transmission electrodes are formed from transparent conductive substances, such as indium tin oxide, the reflection electrodes and the transmission electrodes are not provided on a same layer, and an insulating layer is provided between the reflection electrodes and the transmission electrodes to insulate them from each other. Therefore, it is not necessary for the adjacent pixels in four directions to be spaced apart. Accordingly, the transmission electrodes and the reflection electrodes located in edge regions of the adjacent pixels may abut or may overlap. As a result, a display aperture ratio is reduced and also a requirement of accuracy of manufacturing process is reduced.

Figure 12:
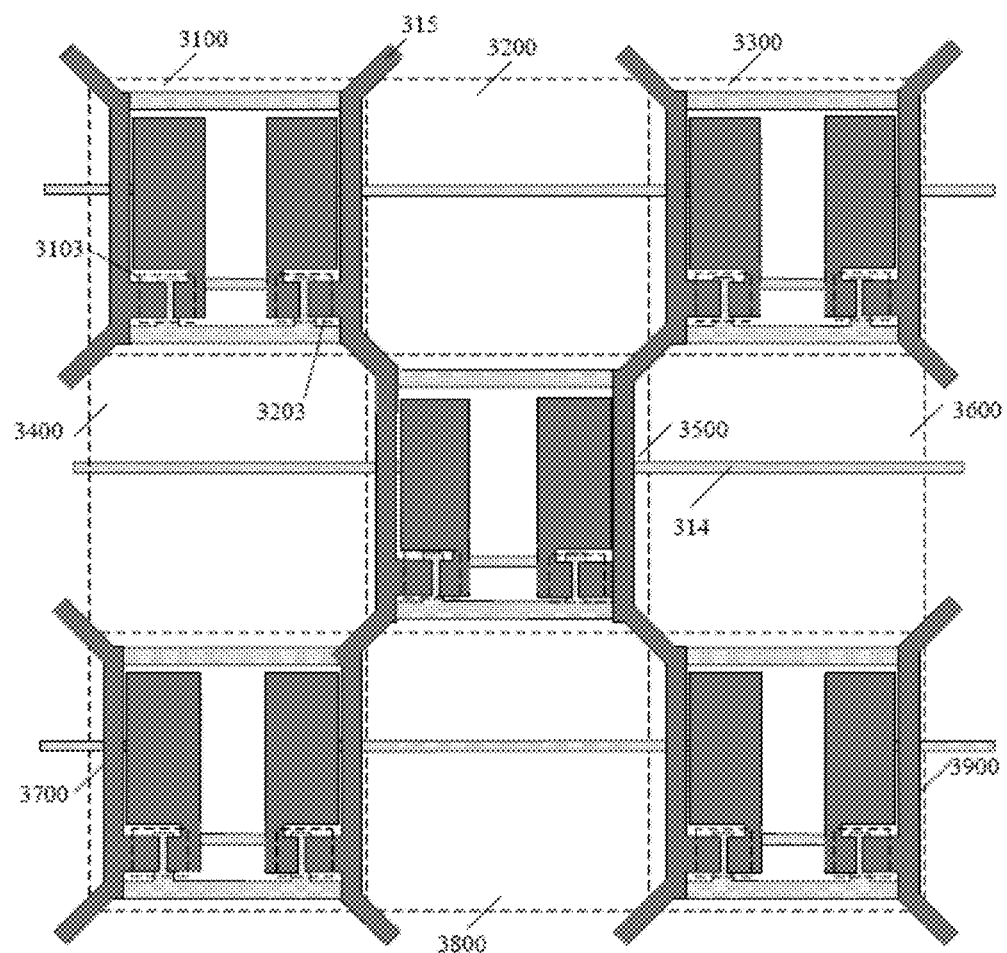
FIG. 12 is a distribution schematic diagram illustrating a data line and a source electrode and a drain electrode of a thin film transistor of the array substrate of the fourth embodiment.
Figure 13:
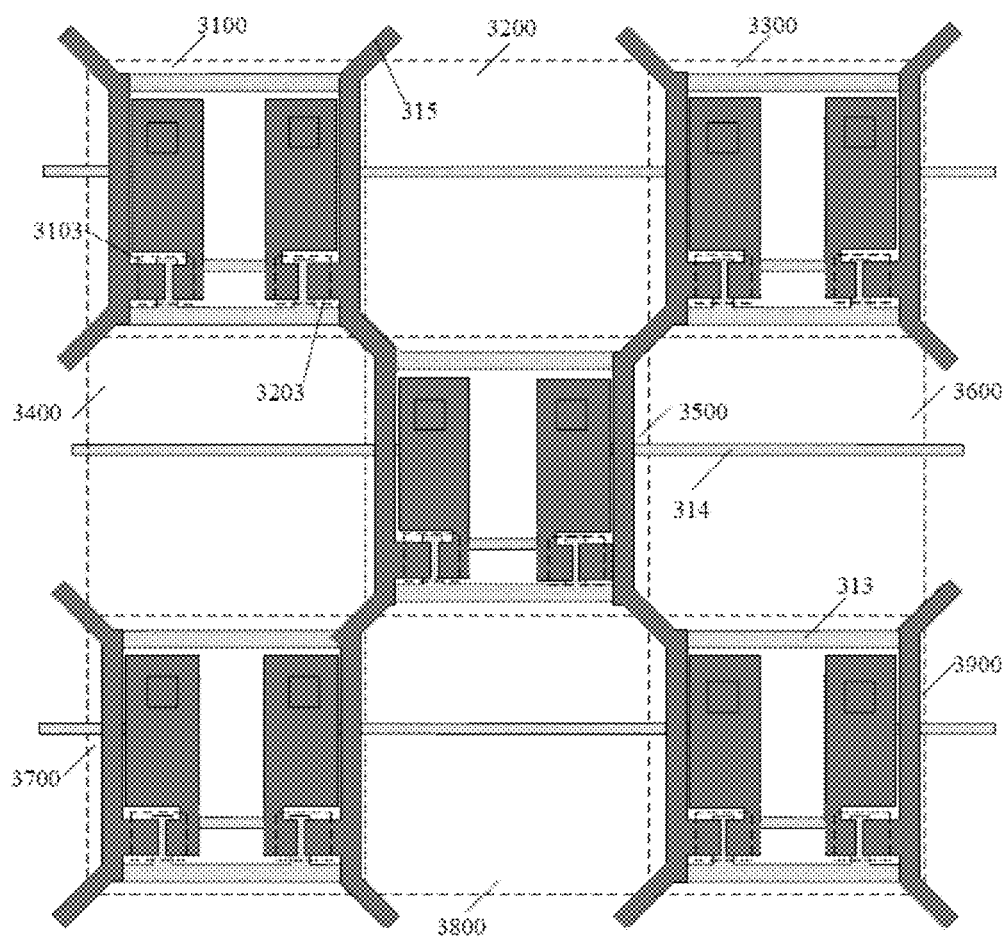
FIG. 13 is a distribution schematic diagram illustrating a via hole corresponding to the drain electrode of the thin film transistor of the fourth embodiment.
Figure 15:
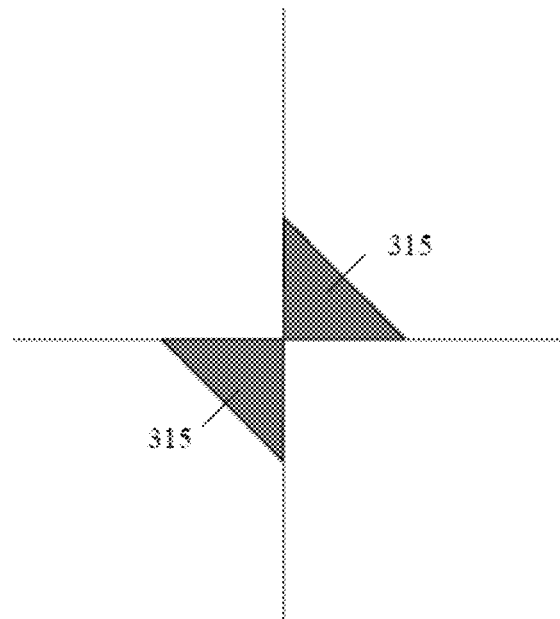
FIG. 15 is an enlarged structure schematic diagram illustrating the region Q of FIG. 14.

Since the first pixels and the second pixels are spaced apart in the row and column directions, a layout of data lines, gate lines, thin film transistors and storage capacitors in the array substrate in the fourth embodiment is different from that in the second and third embodiments. In the following, a detailed description is given in conjunction with FIG. 11 to FIG. 15. FIG. 12 to FIG. 14, which are structure schematic diagrams of three different layers of the array substrate, and FIG. 15 is an enlarged structure schematic diagram of a region Q in FIG. 14.

Figure 11:
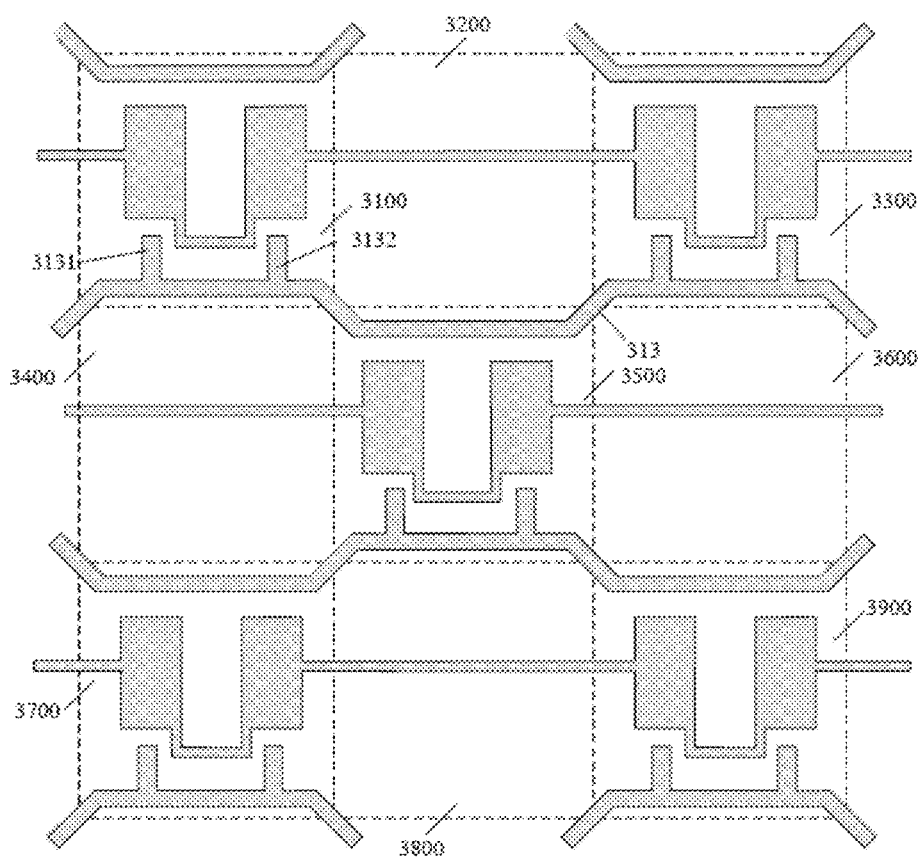
FIG. 11 is a distribution schematic diagram illustrating a gate line and a common electrode line of an array substrate according to a fourth embodiment.

Referring to FIG. 11 and FIG. 14, a plurality of gate lines are provided in parallel under the reflection electrodes located in the edge regions of a plurality of first pixels in two adjacent rows of the pixels, and are connected with a deflection, or angled portion, at adjacent corners of two first pixels whose corners are adjacent in two adjacent rows of the pixels. For example, for a gate line 313, there are a plurality of segments provided in parallel under a reflection electrode 3102 located in an edge region of the first pixel 3100, under a reflection electrode 3502 located in an edge region of the first pixel 3500, and under a reflection electrode 3302 located in an edge region of the first pixel 3300. The gate line 313 is connected with a deflection at adjacent corners of the first pixel 3100 and the first pixel 3500 whose corners are adjacent in two adjacent rows of the pixels, connects two portions provided in parallel under the reflection electrode 3102 and the reflection electrode 3502, is connected with a deflection at adjacent corners of the first pixel 3500 and the first pixel 3300 whose corners are adjacent, and connects two portions provided in parallel under the reflection electrode 3502 and the reflection electrode 3302. According to this arrangement, the display area occupied by the gate line 313 may be greatly reduced. In the present embodiment, the gate line 313 only occupies a very small aperture ratio at corners of a transmission electrode 3201 of the second pixel 3200, a transmission electrode 3401 of the second pixel 3400 and a transmission electrode 3601 of the second pixel 3600. As a result, display area is greatly increased in comparison with the related art.

The data line may also be provided in a similar configuration to that which is discussed above. A plurality of data lines are provided in parallel under the reflection electrodes located in the edge regions of the plurality of first pixels in two adjacent columns of the pixels, and are connected with a deflection, or angled portion, at adjacent corners of two first pixels whose corners are adjacent in two adjacent rows of the pixels. For example, referring to FIG. 12 and FIG. 14, a data line 315 is provided in the row direction. The data line 315 is provided in parallel under the reflection electrode 3102 located in the edge region of the first pixel 3100, under the reflection electrode 3502 located in the edge region of the first pixel 3500, and under a reflection electrode 3802 of the first pixel 3800. The data line 315 is deflected at adjacent corners of the first pixel 3100 and the first pixel 3500, is deflected at adjacent corners of the first pixel 3500 and the first pixel 3700, to connect the parallel portions. The deflection portions of the data line 315 and the deflection portions of the gate line 313 may be superposed in the transmission light direction, and do not additionally occupy an aperture ratio (as shown in FIG. 15).

In order to further increase the aperture ratio, in the array substrate according to the present fourth embodiment, a thin film transistor controlling the first pixel is provided under the reflection electrode located in the edge region of the first pixel, and a thin film transistor controlling the second pixel is provided under the reflection electrode located in the edge region of the first pixel.

Specifically, referring to FIG. 11 to FIG. 14, taking the first pixel 3100 and the second pixel 3200 which are adjacent to each other in a same row as an example, a thin film transistor 3103 driving the first pixel 3100 is provided under the reflection electrode 3102 located in the edge region of the first pixel 3100, and a thin film transistor 3203 driving the second pixel 3200 is provided under the reflection electrode 3102 located in the edge region of the first pixel 3100. In the present embodiment, a layout of gate electrodes, drain electrodes and source electrodes of the thin film transistor is similar to that in the third embodiment, and a thin film transistor of the second pixel is provided under the reflection electrode located in the edge region of the first pixel which is adjacent to the second pixel in left and right directions. The thin film transistor of the second pixel can alternatively be provided under the reflection electrode located in the edge region of the first pixel which is adjacent to the second pixel in upper and lower directions.

In order to increase the aperture ratio in the transmission region, a storage capacitor of the first pixel is provided under the reflection electrode located in the edge region of the first pixel. In addition, a storage capacitor of the second pixel is provided under the reflection electrode located in the edge region of the first pixel which is adjacent to the second pixel. For example, referring to FIG. 11 to FIG. 14, in the present embodiment, a storage capacitor of the first pixel 3100 and a storage capacitor of the second pixel 3200 which is adjacent to the first pixel 3100 are all provided under the reflection electrode 3102 located in the edge region of the first pixel 3100. In the present embodiment, a layout of the storage capacitor is similar to that in the third embodiment. A storage capacitor of the second pixel is provided under the reflection electrode located in the edge region of the first pixel which is adjacent to the second pixel in left and right directions. The storage capacitor of the second pixel can alternatively be provided under the reflection electrode located in the edge region of the first pixel which is adjacent to the second pixel in upper and lower directions.

In the present embodiment, in order to increase a display effect of the pixel, the central region of the first pixel is provided with a transmission electrode, and the transmission electrode and the reflection electrode located in the edge region of the first pixel are electrically connected. In addition, the central region of the second pixel is provided with a reflection electrode, and the reflection electrode and the transmission electrode located in the edge region of the second pixel are electrically connected.

Referring to FIG. 13, a passivation layer is formed on a structure shown in FIG. 12, and via holes configured to electrically connect the drain electrodes and the transmission electrodes of all pixels are formed in the passivation layer.

Referring to FIG. 14, the central region of the first pixel 3100 is provided with a transmission electrode 3101, and the transmission electrode 3101 and the reflection electrode 3102 located in the edge region are electrically connected. Layouts of the first pixel 3300, the first pixel 3500, the first pixel 3700 and the first pixel 3900 may be the same as that of the first pixel 3100. The central region of the second pixel 3200 is provided with a reflection electrode 3202, and the reflection electrode 3202 and the transmission electrode 3201 located in the edge region are electrically connected. Layouts of the second pixel 3200, the second pixel 3400, the second pixel 3600 and the second pixel 3800 may be the same as that of the second pixel 3200.

In the present embodiment, the transmission electrode 3101, a transmission electrode 3301, a transmission electrode 3501, a transmission electrode 3701 and a transmission electrode 3901 are presented as rectangles. In other embodiments, these transmission electrodes may be other shapes, such as circles or rhombuses. In the present embodiment, the reflection electrode 3202, a reflection electrode 3402, a reflection electrode 3602 and a reflection electrode 3802 are presented as rectangles. In other embodiments, these reflection electrodes may be other shapes, such as circles or rhombuses.

In the present embodiment, since the reflection electrode and the transmission electrode are in each pixel, each pixel may achieve both a transmission display and a reflection display. In comparison with the array substrate in the first embodiment in which either the transmission display is achieved or the reflection display is achieved in each pixel, in the case where other conditions are same, a resolution of the array substrate in the present embodiment is increased by two, and a better display quality is achieved.

Because the reflection electrode uses external light for display and the transmission electrode uses a backlight for display, and brightness of the external light is often inconsistent with that of the backlight, brightness displayed by the reflection electrode is often inconsistent with that displayed by the transmission electrode for a same gray level of display data. If areas of the reflection electrodes of each pixel are inconsistent, it may result in inconsistent brightnesses of each of the pixels. Similarly, if different areas of the transmission electrodes are inconsistent, a similar problem may also exist. Therefore, in order to further increase the display effect, in the present embodiment, the areas of all reflection electrodes are provided to be the same, the areas of all transmission electrodes are also the same, which may achieve a uniform display effect.

An organic film is provided between the reflection electrode and the transmission electrode in the array substrate described above. Inside the pixel, the organic film adjusts the cell gap of the reflection electrode to be a half of the cell gap of the transmission electrode. As a result, and optical path difference is achieved. The organic film also electrically isolates the reflection electrode from the transmission electrode.

The array substrate according to the present embodiment has a very high light transmittance. In the array substrate shown in FIG. 14, transmission areas are only occupied at corners (as shown in FIG. 15) where the data line 315 is provided on the second pixel 3200 and the second pixel 3400 and at a transmission electrode where a common electrode line 314 is provided in the second pixel. There are only two places which adversely affect the aperture ratio of the transmission region. Taking the pixel 3100, the pixel 3200, the pixel 3300, the pixel 3400, the pixel 3500, the pixel 3600, the pixel 3700, the pixel 3800 and the pixel 3900 which lengths and widths are all 141 μm as an example, suppose the area of each triangle at a deflection is 50 μm$^2$, area occupied by each segment of the common electrode line at a transmission electrode place is 72 μm$^2$, and the aperture ratio is calculated as below:

an effective display area of the first pixel is 141 μm*141 μm=19981 μm², a total area of the second pixel is also 141 μm*141 μm=19981 μm², the area of transmission light occupied by the data line is 50 μm2*4=200 μm², the area of transmission light occupied by the common electrode line is 72 μm2*2=144 μm², then, an effective display area of the second pixel is 19981-200-144=19637 μm², and the aperture ratio of the array substrate is (19981+19637)/19981*2=99.14%.

The aperture ratio of the array substrate according to the present embodiment is up to 99.14%, which can not be obtained in the related art. It is noted that in other embodiments, a common electrode line and a gate line may be provided in different layers, and the common electrode line may be also provided similar to the gate line or a data line. Based on the present embodiment, an aperture ratio may further be increased.

Various embodiments include a liquid crystal display panel having a thin film transistor array substrate illustrated in any embodiment described above.

Specifically, a liquid crystal display panel may further include a color film substrate. The color film substrate may include, for example, a plurality of color photoresists, a planarizing layer and a common electrode layer of color film substrate. The plurality of color photoresists correspond to a plurality of pixels.

In a conventional liquid crystal display panel, a black matrix is also provided on the color film substrate. In the related art, since a data line, a gate line and a common electrode line all occupy transmission light regions, and all have reflectivenesses, if the black matrix having a property of non-transmission light is not employed to shield the data line, the gate line and the common electrode line, the reflection of the metal may cause poor display quality. However, if the lines include deviations as discussed above, if the color film substrate is jointed in contraposition with the array substrate, the black matrix is generally greatly wider than a metal wiring to be shielded so as to ensure shielding of the metal wiring. As a result, a very large display area is sacrificed. In the liquid crystal display panel according to the presented embodiments, since most of the gate line, the data line, and the common electrode line are under reflection electrodes and occupy a very small transmission region, a black matrix may not be used in the liquid crystal display panel according to the presented embodiments. The description above includes only certain nonlimiting embodiments. Numerous alternations, modifications, and equivalents can be made to the by those skilled in the art in light of the technical content disclosed herein.

What is claimed is:

1. An array substrate, comprising:
    a plurality of pixels arranged in rows and columns;
    a plurality of gate lines along rows of the pixels; and
    a plurality of data lines along columns of the pixels,
    wherein a first one of the pixels comprises a reflection electrode located along the entire periphery of the first pixel,
    a second one of the pixels comprises a transmission electrode located along the entire periphery of the second pixel, and
    the reflection electrode of the first pixel and the transmission electrode of the second pixel are disposed in different layers;
    wherein all pixels adjacent to the first pixel are the second pixel and all pixels adjacent to the second pixel are the first pixel.

2. The array substrate according to claim 1, wherein a first row of pixels comprises a plurality of first pixels, each having a reflection electrode near an edge thereof, and a second row of pixels comprises a plurality of second pixels, each having a transmission electrode near an edge thereof, and wherein the first and second rows are adjacent.

3. The array substrate according to claim 1, wherein a first column of pixels comprises a plurality of first pixels, each having a reflection electrode near an edge thereof, and a second column of pixels comprises a plurality of second pixels, each having a transmission electrode near an edge thereof, and wherein the first and second columns are adjacent.

4. The array substrate according to claim 1, wherein a first row of pixels comprises a plurality of first pixels, each first pixel having a reflection electrode near an edge thereof, and a plurality of second pixels, each second pixel having a transmission electrode near an edge thereof, wherein the first and second pixels of the first row alternate along the first row, wherein a first column of pixels comprises a plurality of first pixels and a plurality of second pixels, wherein the first and second pixels of the first column alternate along the first column.

5. The array substrate according to claim 1, wherein a central region of the first pixel includes a portion of the reflection electrode.

6. The array substrate according to claim 5, wherein the portion of the reflection electrode located in the central region of the first pixel and a portion of the reflection electrode located near the edge of the first pixel comprise a same reflective metal layer and are directly connected.

7. The array substrate according to claim 1, wherein a central region of the first pixel includes a transmission electrode.

8. The array substrate according to claim 7, wherein the transmission electrode located in the central region of the first pixel is electrically connected with the reflection electrode located near the edge of the first pixel.

9. The array substrate according to claim 7, further comprising an organic film between the transmission electrode of the first pixel and the reflection electrode of the first pixel.

10. The array substrate according to claim 7, comprising a plurality of first pixels each comprising a reflection electrode, and a transmission electrode, wherein the transmission electrodes of the first pixels have a same area.

11. The array substrate according to claim 7, wherein the area of the transmission electrode located near the edge of the second pixel is same as the area of the transmission electrode located in the central region of the first pixel.

12. The array substrate according to claim 1, wherein a central region of the second pixel includes a portion of the transmission electrode.

13. The array substrate according to claim 12, wherein the portion of the transmission electrode located in the central region of the second pixel and the transmission electrode located near the edge of the second pixel comprise a same transparent conductive layer and are directly connected.

14. The array substrate according to claim 1, wherein a central region of the second pixel includes a reflection electrode.

15. The array substrate according to claim 14, wherein the reflection electrode located in the central region of the second pixel is electrically connected with the transmission electrode located near the edge of the second pixel.

16. The array substrate according to claim 14, wherein an organic film is provided between the transmission electrode of the second pixel and the reflection electrode of the second pixel.

17. The array substrate according to claim 14, comprising a plurality of second pixels each comprising a reflection electrode, and a transmission electrode, wherein the reflection electrodes of the second pixels have a same area.

18. The array substrate according to claim 17, wherein the area of the reflection electrode located near the edge of the first pixel is same as the area of the reflection electrode located in the central region of the second pixel.

19. The array substrate according to claim 11, comprising a plurality of first pixels each comprising a reflection electrode, and a transmission electrode, and a plurality of second pixels each comprising a reflection electrode, and a transmission electrode, wherein the areas of the transmission electrodes of the first pixels are the same as the areas of the transmission electrodes of the second pixels, and the areas of the reflection electrodes of the first pixels are same as the areas of the reflection electrodes of the second pixel.

20. The array substrate according to claim 1, wherein an edge of the reflection electrode located in an edge region of the first pixel and an edge of the transmission electrode located in an edge region of the second pixel are aligned or overlap.

* * * * *